United States Patent [15] 3,674,997
Hamano [45] July 4, 1972

[54] RIGHT SHIFTING SYSTEM WITH DATA STORED IN POLISH STACK FORM

[72] Inventor: Goro Hamano, Osaka-shi, Japan
[73] Assignee: Matsushita Electric Industrial Co., Ltd., Kadoma, Osaka, Japan

[22] Filed: Feb. 16, 1970
[21] Appl. No.: 11,385

[30] Foreign Application Priority Data

Feb. 26, 1969 Japan ....................................44/15197
Feb. 26, 1969 Japan ....................................44/15198

[52] U.S. Cl. ..............................................235/159, 235/167
[51] Int. Cl. ..............................................G06f 7/48
[58] Field of Search ..........................235/159, 165, 167, 176

[56] References Cited

UNITED STATES PATENTS 3,531,632 9/1970 Herr ......................................235/176
3,526,760 9/1970 Ragen ....................................235/158
3,405,392 10/1968 Milne et al. ........................235/156 X

*Primary Examiner*—Malcolm A. Morrison
*Assistant Examiner*—David H. Malzahn
*Attorney*—Wenderoth, Lind & Ponack

[57] ABSTRACT

A right shifting system of a circulating register storing a plurality of time-space registers in serial of bits, in time division serial of time-space registers and in serial of digits. The system has a first shift register means, a second shift register means which receives output signals from the first shift register means, an input gate means which feeds input signals from both shift register means and for which two signal paths are provided, the first path receiving output signals from the first shift register means and the second path receiving output signals from the second shift register means, and a control circuit means which is coupled to the input gate means and which controls input signals to the input gate means from the two signal paths selectively so that the right shifting operation of the contents of at least two time-space registers of the plurality of time-space registers is completed.

2 Claims, 8 Drawing Figures

INVENTOR
GORO HAMANO

BY Wenderoth, Lind & Ponack
ATTORNEYS

INVENTOR
GORO HAMANO

BY Wenderoth, Lind & Ponack
ATTORNEYS

INVENTOR
GORO HAMANO

BY Wenderoth, Lind & Ponack
ATTORNEYS

RIGHT SHIFTING SYSTEM WITH DATA STORED IN POLISH STACK FORM

This invention relates to a digital data processor and more particularly to means and a method of attaining right shifting of the contents of the registers in a digital data processor.

A conventional electronic desk calculator into which numbers are set by the use of a 10-key figure keyboard has a plurality of time-space registers, the contents of which are stored in a circulating register comprising a delay line and shift registers, in series of bits, in time division series of time-space registers, and in series of digits. In a multiplication operation initiated by an instruction from a function keyboard, the contents of the two time-space registers which hold the multiplier and the sum of the partial product are required to be shifted to the right. The contents of any register is shifted to the right by forcing the output signal of the delay line to bypass the shift registers having a capacity of $R \times B$ bits, where $R$ is the number of the time-space registers, the contents of which are stored in the circulating register, and $B$ is the number of bits forming a digit. Therefore, the circulating register has a delay line and a long shift register, the length of which depends upon the number of the time-space registers and the number of bits forming a digit. Such a circulating register and recirculating control circuits become complicated and expensive.

This invention seeks to provide a circulating register having shift registers with a shorter length than that of the shift registers in the conventional circulating register for the given number of time-space registers and seeks to provide a new right shifting method for the registers.

It is an object of this invention to provide right shifting means for right shifting of the contents of the time-space registers for a digital data processor such as an electronic desk calculator.

It is another object of this invention to provide right shifting means for a digital data processor having a simple construction.

These and other objects will be readily apparent to those skilled in the art from an examination of the following specification and accompanying drawings, wherein.

For easy understanding of the scope of the present invention, the conventional right shifting means and the conventional multiplication process of the electronic desk calculator will first be described with reference to FIGS. 1 and 2.

The following description will be of, for convenience, an electronic calculator having four time-space registers, each of which has a 10 digit capacity and holds numbers in binary coded decimal (BCD) code. The contents of these four time-space registers are stored in a circulating time-space register in series of bits, in time division series of registers, and in series of digits, that is, in Polish stack form.

In the multiplication operation, the first time-space register holds the multiplier, the second time-space register holds the multiplicand, the third time-space register holds the product and the fourth time-space register is used as a memory time-space register which does not concern the multiplication operation.

Normally, the multiplicand is stored in the second time-space register and the multiplier is in the third time-space register before the arithmetic operation.

In the following description, the contents of the first, the second, the third, and the fourth time-space registers are represented by A, B, C and D, respectively. The contents of the first and second digits of each time-space register are represented by A—1, B—1, C—1, D—1, A—2, B—2, C—2 and D—2. The rest of the contents of each register are represented in the same way as above. And the contents of each bit position corresponding to code "1," code "2", code "4" and code "8" of each time-space register are represented by $R_1$, $R_2$, $R_4$ and $R_8$. As the contents of the four time-space registers are stored in a circulating register in series of bits, in time division series of time-space registers, and in series of digits, the arrangement of the contents of the four time-space registers is in the order of $A_1$—1, $A_2$—1, $A_4$—1, $A_8$—1, 11—1, $B_2$—1, $B_4$—1, $B_8$—1, $C_1$—1, $C_2$—1, $C_4$—1, $C_8$—1, $D_1$—1, $D_2$—1, $D_4$—1, $D_8$—1, $A_1$—2, $A_2$—2, $A_4$—2, $A_8$—2 . . . and so on.

Figure 1:
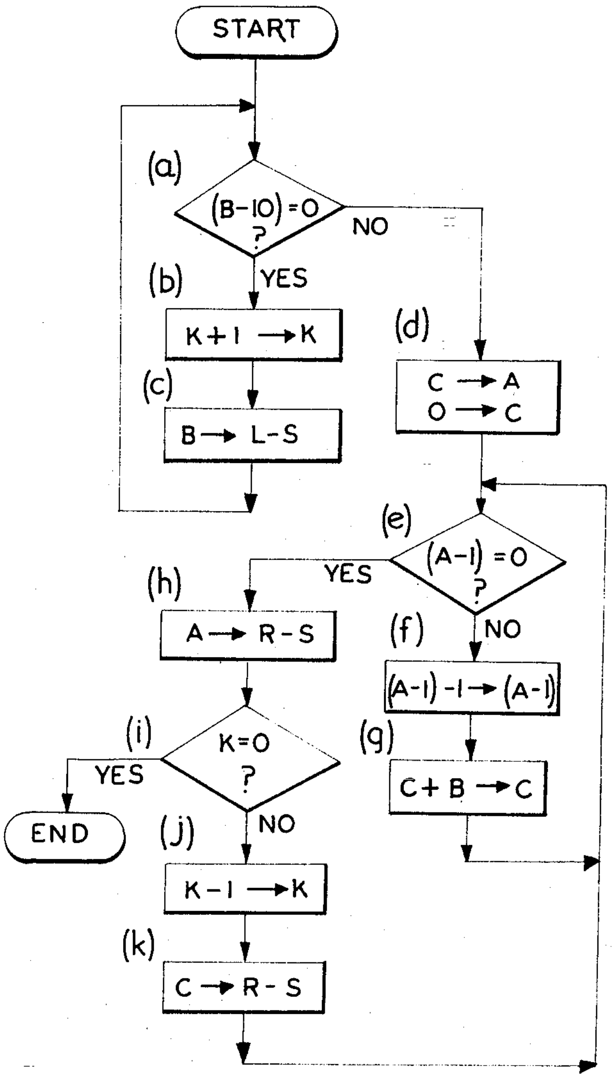
FIG. 1 (PRIOR ART)
FIG. 1 is a flow chart of the multiplication operation of a conventional electronic desk calculator.

FIG. 1 is a flow chart illustrating various action steps. Each of said various action steps is dependent upon states of the control circuit (not shown) and is governed by the program control circuit (not shown). The calculator is a fixed decimal point position type. The decimal point position of the calculator is predetermined and the decimal point position of the product has to be equal to the predetermined decimal point position after the multiplication operation. The contents of a counter K are used to control the decimal point position of the product. Therefore, the counter K holds the number showing the digit capacity below the decimal point position before the multiplication operation. For, example, the counter K is cleared to zero before the multiplication operation when the decimal point position of the calculator is predetermined to be zero.

The program control circuit and/or the control circuit test whether the contents of the 10-th digit of the second time-space register, i.e., B—10, are zero in an action step (a). When B—10 is zero, the program control circuit selects the actions steps (b) and (c) in order.

In the action step (b), a counter K counts up by one. In the action step (c), the contents of the second time-space register are shifted to the left by one digit. At the end of the action step (c), the program control circuit again selects the action step (a) and then the same operation as above is repeated.

Therefore, the contents of the second time-space register are shifted to the left repeatedly until the most significant digit position of the second time-space register holds non-zero data. When B—10 is not zero when tested in the action step (a), the program control circuit selects an action step (d) as a next step.

In the action step (d), a multiplier in the third time-space register is transferred to the first time-space register and the third register is cleared. Next, in an action step (e), a test is made as to whether the contents of the least significant digit of the first register are zero. If they are not zero, the program control circuit selects an action step (f) as a next step, in which the contents of the least significant digit of the first register are reduced by one. In a next action step (g), the contents of the second time-space register are added to the contents of the third time-space register. After the action step (g), the program control circuit again selects the action step (e).

Thus, the contents of the second time-space register are added repeatedly to the contents of the third time-space register for a number of times equal to the number of the least significant digit of the multiplier by repeating the action steps (e), (f) and (g).

If the contents of the least significant digit of the first time-space register are zero in the action step (e), the program control circuit selects action steps (h), (i), (j) and (k) in order, and then again selects the action step (e).

In the action step (h), the contents of the first time-space register are shifted to the right by one digit.

In the action step (i), a test is made to determine whether the contents of the counter K are zero. If they are zero, the program control circuit selects the end step of the arithmetic operation. If they are not zero, the counter K counts down by one in the action step (j) and the contents of the third time-space register are shifted to the right by one digit in the action step (k).

The multiplication operation is carried out while the program control circuit is repeating the above actions.

As shown in FIG. 1, the contents of the first register and the third time-space register are shifted to the right in the action steps (h) and (k), respectively.

Figure 2:
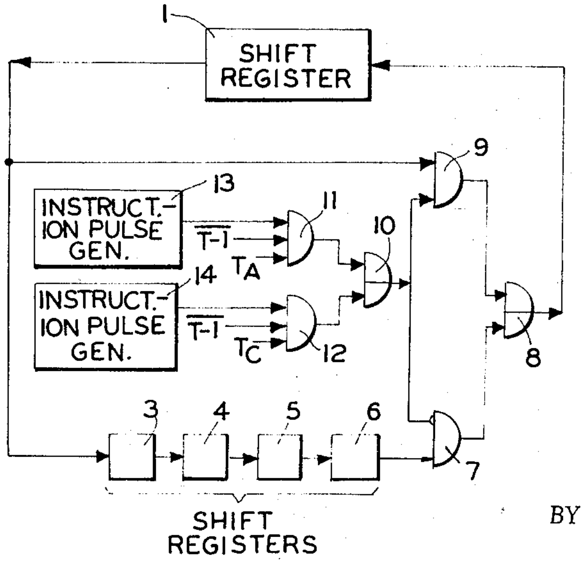
FIG. 2 (PRIOR ART)
FIG. 2 is a block diagram of conventional right shifting means for an electronic desk calculator having four time-space registers, each of which has a 10 digit capacity.

Referring to FIG. 2, an output signal of a 144-bit serial shift register 1 is fed to a four-bit shift register 3. The 144-bit serial shift register 1 can usually be replaced by a magnetostrictive delay line. An output signal of the four-bit shift register 3 is fed to four-bit shift registers 4, 5 and 6 which are connected to each other in tandem. An output signal from the four-bit shift register 6 is fed to an input terminal of the 144-bit shift register 1 through an INHIBIT gate 7 and an OR gate 8 so that the five shift registers 1, 3, 4, 5 and 6 constitute a 160-bit circulating register.

Figure 5:
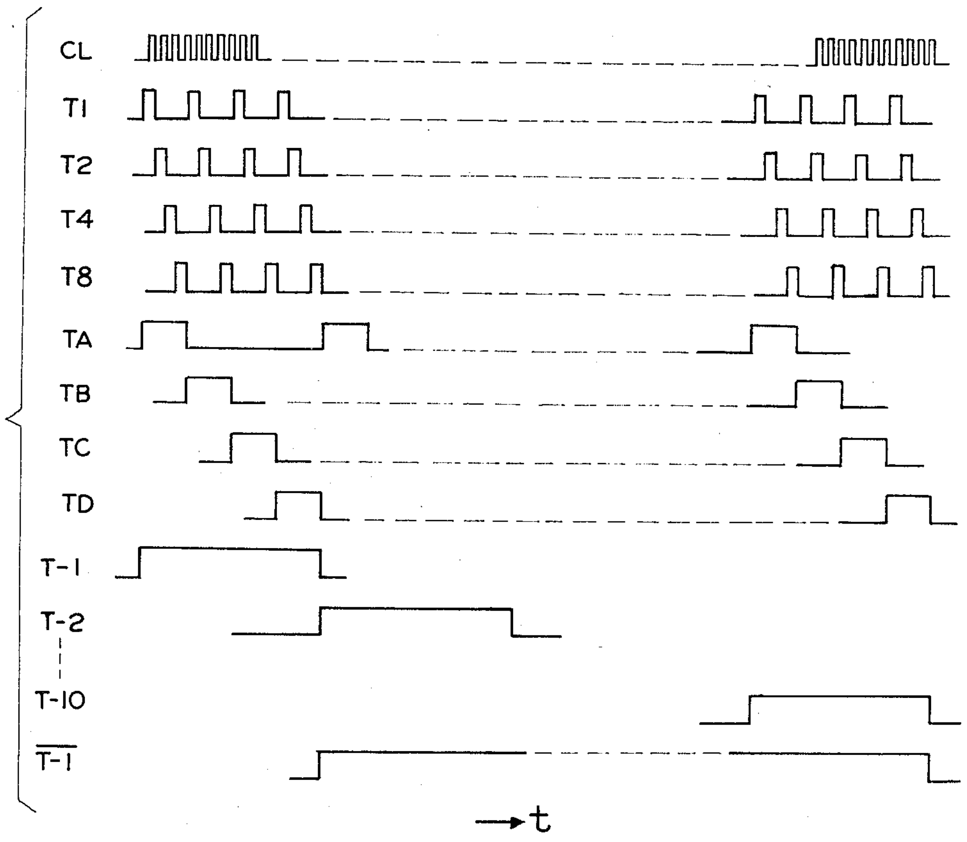
FIG. 5 is a diagram showing the clock pulses in the electronic desk shown in FIGS. 2 and 4.

Referring now to FIG. 5, CL is the master clock pulse which is supplied to the shift registers 1, 3, 4, 5 and 6, and if necessary, to other circuits. $T_1$, $T_2$, $T_4$ and $T_8$ represent clock pulses specifying the time of the output signals from the 144-bit shift register 1 and correspond to code "1", code "2", code "4" and code "8" of the BCD codes, respectively.

$T_A$, $T_B$, $T_C$ and $T_D$ are clock pulses specifying the time of the output signals of the 144-bit shift register 1 and correspond to the contents of the first time-space register, the second time-space register, the third time-space register and the fourth time-space register, respectively.

And T—1, T–2, . . . , T—10 are clock pulses specifying the time of the output signals of the 144-bit shift register 1 and correspond to the first digit, the second digit, and so on, up to the 10th digit from the least significant digit.

As set forth in the above description, the 160-bit circulating register has stored therein the contents of the first time-space register, the second time-space register, the third time-space register and the fourth time-space register which are arranged in series of bits, in time division series of time-space registers and in series of digits.

In accordance with the action step (h) shown in FIG. 1, an instruction pulse generator 13 generates an instruction pulse having a pulse width equal to the time necessary for the 160-bit circulating register to perform one cycle. Consequently, the contents of the first time-space register are shifted to the right by one digit. At the time of $\overline{\text{T—1}}$ and $T_A$, INHIBIT gate 7 is closed and the AND gate 9 is open since the OR gate 10 becomes logically "1", due to the output from AND gate 11, to which the instructive pulse and the clock pulses $\overline{\text{T—1}}$ and $T_A$ are fed.

Similarly, in the action step (k) in FIG. 1, the contents of the third time-space register are controlled by an output signal of an AND gate 12 at the time $\overline{\text{T—1}}$ and $T_C$ and are shifted to the right by one digit when an instruction pulse generator 14 generates an instruction pulse.

In the above example, the right shifting operation requires that the number of four-bit shift registers 3, 4, 5 and 6 be equal to the number of time-sapce registers in the circulating register.

An increase in the number of the time-space registers in the circulating register requires an increase in the number of the four-bit shift registers. Therefore, the circuit construction becomes complicated and expensive.

In addition, the contents of the third time-space register are required to be transferred to the first time-space register in the action step (d) during the multiplication operation in accordance with the flow chart shown in FIG. 1, and therefore, a gate means and a control circuit are necessary for such requirement.

Figure 3:
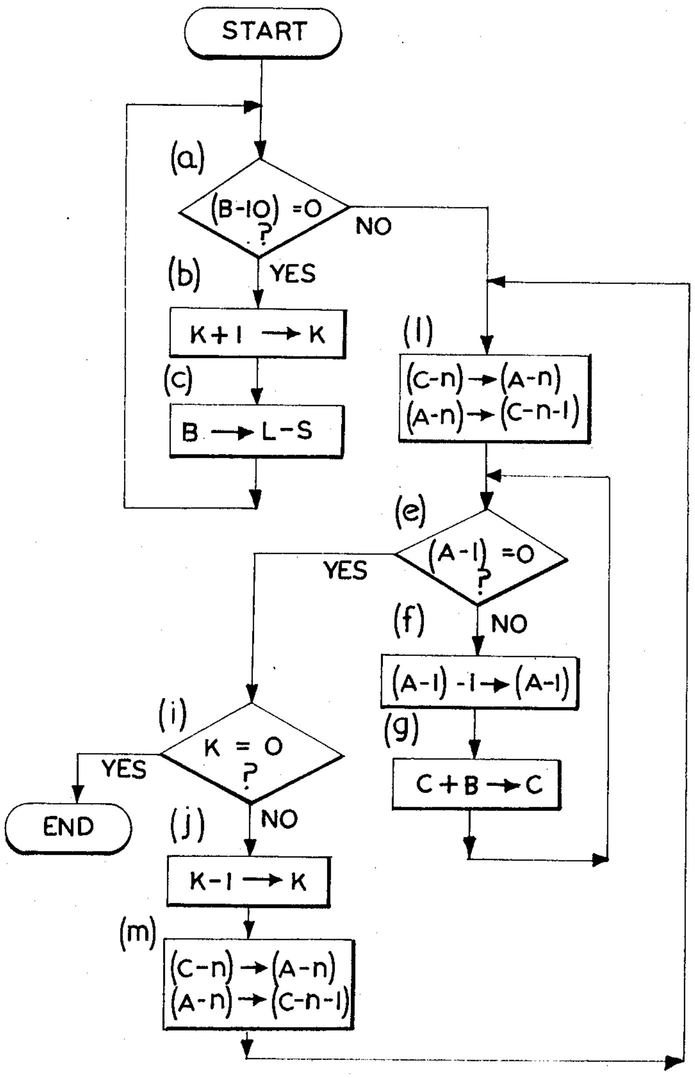
FIG. 3 is a flow chart of the multiplication operation of an electronic desk calculator in accordance with the invention.

This invention seeks to eliminate the above defects. A flow chart according to the present invention is shown in FIG. 3 and describes the same general operation as the flow chart shown in FIG. 1. The flow chart of FIG. 3 differs from that of FIG. 1 in that the action steps (d), (h) and (k) of FIG. 1 are eliminated, and action steps (l) and (m) are added, while the other steps are the same as FIG. 1.

Each of the various action steps in FIG. 3 is dependent upon the state of a control circuit (not shown) and is governed by a program control circuit (not shown).

The following description will be of, for convenience, an electronic calculator having four time-space registers, each of which has a 10 digit capacity and holds numbers in BCD code. The contents of these four time-space registers are stored in a circulating time-space register in series of bits, in time division series of registers, and in series of digits, that is, in Polish stack form. The calculator is of fixed decimal point position type and the decimal point position of the calculator is predetermined.

In a multiplication operation, the first time-space register holds the multiplier, the second time-space register holds the multiplicand, the third time-space register holds the product and the fourth time-space register is used as a memory register which does not concern the multiplication operation.

Normally, the multiplicand is stored in the second time-space register and the multiplier is in the third time-space register before the arithmetic operation.

In the following description, the contents of the first, the second, the third and the fourth register are represented by A, B, C and D, respectively. The contents of the first and the second digits of each time-space register are represented by A—1, B—1, C—1, D—1, A–2, B–2, C–2 and D–2. The rest of the contents of each time-space register are represented in the same way as above.

Referring to FIG. 3, the control circuit and/or the program control circuit test whether the contents of the 10th digit of the second time-space register, i.e., B—10, are zero in an action step (a). When B—10 is zero, the program control circuit selects actions steps (b) and (c) in order.

In the action step (b), a counter K counts up by one. The contents of the counter K are used to control the decimal point position of the product. In the action step (c), the contents of the second time-space register are shifted to the left by one digit. At the end of the action step (c), the program control circuit again selects the action step (a) and the same operation as above is repeated.

Therefore, the contents of the second time-space register are shifted to the left repeatedly till the most significant digit position of the second time-space register holds non-zero data. When B—10 is not zero when tested in the action step (a), the program control circuit selects an action step (l) as a next step. (l)

In the action step (l), the contents of the third register are transferred to the first register and at the same time, the original contents of the first time-space register are transferred to the third time-space register while shifting to the right by one digit. Therefore, at the beginning of the multiplication, the contents of the third time-space register are transferred to the first time-space register and the third time-space register is cleared in the first action step (l) following the action step (a), as the first time-space register is cleared before the multiplication operation.

Next, in an action step (e), a test is made to determine whether the contents of the least significant digit of the first time-space register is zero. If they are not zero, the program control circuit selects an action step (f) as a next step, in which the contents of the least significant digit of the first time-space register are reduced by one. In an action step (g), the contents of the second time-space register are added to the contents of the third register. After the action step (g), the program control circuit again selects the action step (e).

Thus, the contents of the second time-space register are added repeatedly to the contents of the third time-space register for a number of times equal to the number of the least significant digit of the multiplier by looping the action steps (e), (f) and (g).

If the (1). of the least significant digit of the first time-space register is zero in the action step (e), the program control circuit selects actions steps (i), (j) and (m) in order and again selects the action step (l).

In the action step (i), a test is made to determine whether the contents of the counter K are zero. If they are zero, the program control circuit selects the end step of the arithmetic operation. If they are not zero, the counter K counts down by one in the action step (j).

In each of the action steps (l) and (m), the contents of the third time-space register are transferred to the first time-space register and at the same time, the original contents of the first time space register are transferred to the third time-space register while shifting to the right by one digit.

Therefore, the contents of the first time-space register and the third register are shifted to the right by one digit through the action steps (m) and (l).

The multiplication operation is carried out while the program control circuit is repeating the above actions.

Figure 4:
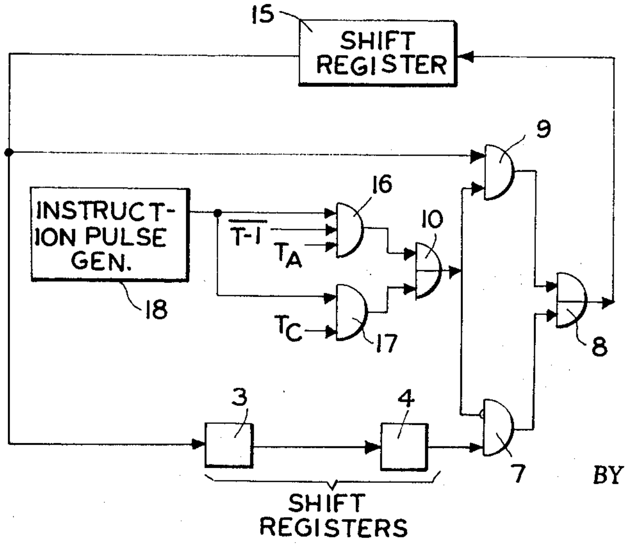
FIG. 4 is a block diagram of right shifting means for an electronic desk calculator having four registers, each of which has a 10 digit capacity, in accordance with the invention.

Referring to FIG. 4, wherein similar reference characters designate elements similar to those of FIG. 2, an output signal of a 152-bit shift register 15 is fed to four-bit shift registers 3 and 4 which are connected to each other in tandem. An output signal of the four-bit shift register 4 is fed to an input terminal of the 152-bit shift register 15 through an INHIBIT gate 7 and an OR gate 8. A 160-bit circulating register is constituted by the shift registers 3, 4 and 15.

In the action step (l) or (m) shown in FIG. 3, an instruction pulse generator 18 generates an instruction pulse having a pulse width equal to the time necessary for the 160-bit circulating register to perform one cycle. The instruction pulse causes the contents of the third time-space register to transfer to the first time-space register through an AND gate 9 at the time of $Tc$. At the time of $Tc$, the INHIBIT gate 7 is closed through an OR gate 10 as an AND gate 17 becomes logically "1" by being fed clock pulse $T_C$ and the instruction pulse. At the time of $\overline{T-1}$ and $T_A$, the contents of the first time-space register are also transferred to the third time-space register through the AND gate 9 as the gate 16 becomes logically "1" by being fed clock pulses $\overline{T-1}$, $T_A$ and the instructional pulse.

Since the time-space registers in the circulating register are arranged in an order of the first, the second, the third and the fourth time-space registers, the contents of each digit of the first time-space register are put into the third time-space register at digit positions lower by one digit than those of the first time-space register. Thus, the contents of the first time-space register are transferred to the third time-space register while being shifted to the right by one digit.

Figure 6A:
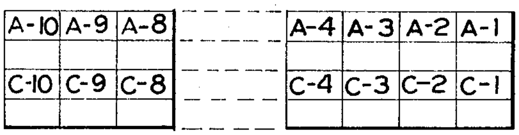
FIGS. 6A—6C are diagrams showing the data in the time-space registers for explanation of the operations of the right shifting means of the electronic desk calculator shown in FIG. 4, in accordance with the invention.
Figure 6B:
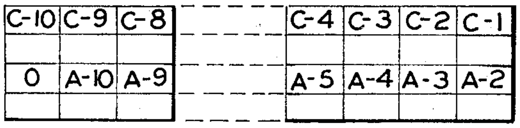
Figure 6C:
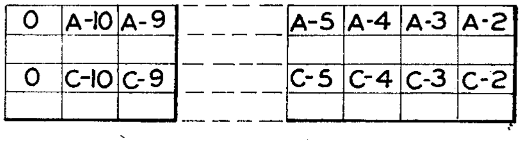

FIG. 6A shows the initial state of the time-space registers. The state of the time-space registers changes to the state shown in FIG. 6B after the first operating step. In the second operating step, the same operation as in the first operating step, is executed. FIG. 6C shows the final state of the time-space registers after the second operating step. Thus, the contents of the first time-space register and the third time-space register are shifted to the right by one digit.

The above description explains that the right shifting operation of the contents of two time-space registers (A and C) of four time-space registers (A, B, C and D) has been completed by repeating a couple of operations, the first of which transfers the contents of the foremost time-space register (A) of two time-space registers (A and C) to the hindmost time-space register (C) of two time-space registers (A and C) at a digit position lower by one digit than a normal digit position and the second of which transfers the contents of two time-space registers (A and C) except the foremost time-space register (A) ahead by one time-space register position in two time-space registers (A and C) by bypassing the shift registers 3 and 4 during each operating step until all the contents of the two time-space registers (A and C) are shifted to the right by one digit. The right shifting operation of contents of more than two time-space registers can be carried out in the same way.

As mentioned above, right shifting means of a simple construction for a digital data processor in accordance with the invention reduces the numbers of the four-bit shift registers necessary for the conventional right shifting means. Such reduction need not be limited to a case of the four-bit shift register.

Moreover, the right shifting means in accordance with the present invention makes it unnecessary to employ additional means for transferring the contents of the third register to the first register in the multiplication operation. Therefore, the circuit construction for the multiplication operation becomes simple.

It will be understood that the invention is not to be limited to the exact construction shown and described, but that various changes and modifications may be made without departing from the spirit and scope of he invention, as defined in the appended claims.

I claim:

1. A right shifting system for a circulating register storing a plurality of time-space registers in serial of bits, in time division serial of time-space registers and in serial of digits comprising:

a first shift register means;

a second shift register means which receives output signals from said first shift register means;

an input gate means having an output coupled to said first shift register means and which feeds input signals from said shift register means and for which two signal paths are provided, the first path receiving output signals from said first shift register means and the second path receiving output signals from said second shift register means which is delayed depending upon the length of said second shift register means compared with the signals in said first path; and a control circuit means which is coupled to said input gate means and which controls the flow of signals through said input gate means from said two signal paths selectively so that the right shifting operation of the contents of at least two time-space registers of said plurality of time-space registers is completed by repeating a couple of operations, the first of which is transferring the contents of the foremost time-space registers to the hindmost time-space register of said at least two time-space registers at a digit position lower by one digit than a normal digit position of said foremost time-space register, and the second of which is transferring the contents of said at least two time-space registers except the foremost time-space register ahead by one time-space register position in said at least two time-space registers by using said first path during each operation step until all the contents of said at least two time-space registers are shifted to the right by one digit.

2. A right shifting system of a circulating register as claimed in claim 1, wherein said plurality of time-space registers consist of four time-space registers, said at least two time-space registers consist of two time-space registers in which said foremost time-space register is cleared before multiplication and holds the multiplier during multiplication and in which said hindmost time-space register holds the multiplier before multiplication and holds the sum of the partial product or the product during multiplication, and said control circuit means including means for controlling said two signal paths during multiplication for carrying out the transfer operation of the multiplier in said hindmost time-space register to said foremost time-space register and subsequently the right shifting operation of both the multiplier and the sum of the partial product or the product.

* * * * *